Patented June 23, 1936

2,045,111

UNITED STATES PATENT OFFICE 2,045,111

CYANURIC ACID

Erich Theis, Mannheim, Germany, assignor to I. G. Farbenindustrie Aktiengesellschaft, Frankfort-on-the-Main, Germany No Drawing. Application March 6, 1934, Serial No. 714,270. In Germany March 11, 1933

4 Claims. (Cl. 260—27)

The present invention relates to a process of producing cyanuric acid.

By the processes hitherto usual for the preparation of cyanuric acid, namely by heating urea with chlorine or anhydrous zinc chloride, the cyanuric acid is obtained in an unsatisfactory yield and in such an impure form that working up of the crude product is necessary.

I have now found that cyanuric acid of great purity is obtained in a good yield by heating at temperatures above about 250° C., advantageously at about 300° C., the chlorides obtainable from carbamic acid chloride by splitting off hydrogen chloride and condensation, such as allophanic acid chloride (NH$_2$CO—NHCOCl) or biuret carboxylic acid chloride (NH$_2$CO—NHCO—NHCOCl) or mixtures thereof which may also contain more highly condensed acid chlorides or small amounts of undecomposed carbamic acid chloride. Cyanuric acid is then formed in a practically quantitative yield with the splitting off of hydrogen chloride; the cyanuric acid obtained contains at the most traces of chlorine. The said splitting off of hydrogen chloride from carbamic acid chloride and the simultaneous condensation to allophanic acid chloride and/or biuret carboxylic acid chloride already takes place at ordinary temperature, but may be accelerated by heating carbamic acid chloride, preferably under reflux and if desired in the presence of an inert organic solvent, such as benzene, to a moderate temperature, for example between about 30° and about 100° C., while carefully excluding the access of water.

The conversion of the carbamic acid chloride into the allophanic acid chloride and/or other chlorides of the said kind may be combined with the preparation of the cyanuric acid in one operation, for example by first heating the carbamic acid chloride to a moderate temperature, if desired in the presence of a diluent such as benzene, the resulting product being converted into cyanuric acid by heating at from 250° to 300° C., if desired after removal of the diluent.

The following examples will further illustrate how the invention is carried out in practice but the invention is not restricted to these examples. The parts are by weight.

Example 1

20 parts of allophanic acid chloride are heated at 290° C. in a porcelain crucible in a sandbath for several hours while repeatedly stirring round. About 14 parts of cyanuric acid entirely free from chlorine are obtained in the form of a crystalline mass.

Example 2

19 parts of a mixture mainly consisting of biuret carboxylic acid chloride obtained by heating carbamic acid chloride at 80° C. are heated at 300° C. in the manner described in Example 1. About 15 parts of cyanuric acid free from chlorine are obtained.

The cyanuric acid may be freed from any small amount of impurities present by sublimation or crystallization.

Example 3

30 parts of carbamic acid chloride are dissolved in 100 parts of benzene and warmed at about 35° C. for 8 hours under a reflux condenser. The separating product, mainly consisting of allophanic acid chloride is filtered off and then heated at about 300° C. for several hours as described in Example 1. About 16 parts of pure cyanuric acid free from chlorine are obtained.

Example 4

30 parts of carbamic acid chloride dissolved in 175 parts of benzene are heated in a porcelain crucible for 8 hours at about 35° C., whereupon the temperature is gradually raised whereby increasing amounts of benzene and hydrogen chloride vapors are evolved. The temperature is finally raised to about 300° C. After heating for several hours a residue remains consisting of 16.4 parts of pure cyanuric acid free from chlorine.

What I claim is:—

1. A process of producing cyanuric acid which comprises heating a substance selected from the group consisting of allophanic acid chloride, biuret carboxylic acid chloride and mixtures of the said chlorides, at a temperature above 250° C.

2. A process of producing cyanuric acid which comprises heating a substance selected from the group consisting of allophanic acid chloride, biuret carboxylic acid chloride and mixtures of the said chlorides, at about 300° C.

3. A process of producing cyanuric acid which comprises warming carbamic acid chloride at a moderate temperature and then heating the resulting product at a temperature above 250° C.

4. A process of producing cyanuric acid which comprises warming carbamic acid chloride at a moderate temperature in an inert organic diluent, evaporating the said diluent and heating the resulting product at a temperature above 250° C.

ERICH THEIS.